United States Patent
Tashima et al.

(10) Patent No.: US 11,753,959 B2
(45) Date of Patent: Sep. 12, 2023

(54) TURBINE POWER GENERATION SYSTEM

(71) Applicant: TOSHIBA ENERGY SYSTEMS & SOLUTIONS CORPORATION, Kawasaki (JP)

(72) Inventors: Tsuguhisa Tashima, Kanagawa (JP); Takahiro Yamamoto, Kanagawa (JP); Koki Nishimura, Kanagawa (JP); Takahiro Ono, Tokyo (JP); Shogo Iwai, Tokyo (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/339,017

(22) Filed: Jun. 4, 2021

(65) Prior Publication Data

US 2022/0010686 A1    Jan. 13, 2022

(30) Foreign Application Priority Data

Jul. 10, 2020   (JP) .................................. 2020-119048

(51) Int. Cl.
*F01D 15/10* (2006.01)
*H02K 7/02* (2006.01)

(52) U.S. Cl.
CPC .......... *F01D 15/10* (2013.01); *F05D 2220/30* (2013.01); *F05D 2220/76* (2013.01); *H02K 7/02* (2013.01)

(58) Field of Classification Search
CPC ...... F01D 15/10; F01D 21/02; F05D 2220/30; F05D 2220/31; F05D 2220/32;
(Continued)

(56) References Cited

U.S. PATENT DOCUMENTS 3,151,841 A  *  10/1964  Henny .................. F01D 17/162
                                                         415/161
4,387,562 A       6/1983  Takao et al.
(Continued)

FOREIGN PATENT DOCUMENTS

DE    102018208087 A1 * 11/2019 ........... F01D 13/003
EP      2 154 336 A1     2/2010
(Continued)

OTHER PUBLICATIONS

Popat, et al., "Fault Ride-Through Capability of Cascaded Current-Source Converter-Based Offshore Wind Farm," IEEE Transactions on Sustainable Energy, vol. 4, No. 2, Apr. 2013, 11 pages.

*Primary Examiner* — Mark A Laurenzi
*Assistant Examiner* — Xiaoting Hu
(74) *Attorney, Agent, or Firm* — Foley & Lardner LLP

(57) ABSTRACT

There is provided a turbine power generation system with a single casing configuration capable of easily executing the inhibition of an over-rotation speed. A turbine power generation system in an embodiment includes: a turbine including a turbine casing and a turbine rotor that rotates by a working medium to be introduced into the turbine casing; and a power generator including a power generator rotor connected to the turbine rotor, the power generator being caused to generate power by rotation of the power generator rotor caused by the rotation of the turbine rotor. The turbine casing of the turbine is single, and a moment of inertia of the power generator rotor is larger than a moment of inertia of the turbine rotor.

3 Claims, 6 Drawing Sheets

(58) Field of Classification Search
CPC ............ F05D 2220/72; F05D 2220/74; F05D 2220/76; F05D 2220/762; F05D 2220/764; F05D 2220/7642; F05D 2220/7644; F05D 2220/7646; F05D 2220/766; F05D 2220/768; F05D 2270/021; F05D 2260/43; H02K 7/02; H02K 7/025

See application file for complete search history.

(56) References Cited

U.S. PATENT DOCUMENTS

| | | | | |
|---|---|---|---|---|
| 4,827,170 | A | * | 5/1989 | Kawamura .......... H02K 7/1823 310/156.28 |
| 2011/0179799 | A1 | | 7/2011 | Allam |
| 2013/0241203 | A1 | * | 9/2013 | Kleen ..................... F01D 15/10 290/52 |
| 2015/0171705 | A1 | * | 6/2015 | Hino ....................... F01D 15/10 290/1 A |
| 2017/0114665 | A1 | * | 4/2017 | Gemin ................... H02P 9/007 |
| 2017/0298826 | A1 | * | 10/2017 | Ryznic ..................... F02C 7/18 |
| 2019/0017443 | A1 | * | 1/2019 | Eifert ................. F41H 13/0043 |

FOREIGN PATENT DOCUMENTS

| | | |
|---|---|---|
| GB | 2 483 866 A | 3/2012 |
| JP | S60-066640 A | 4/1985 |
| JP | S63-212705 A | 9/1988 |
| JP | 2003-322028 A | 11/2003 |
| JP | 2016-512302 A | 4/2016 |
| JP | 2017-096258 A | 6/2017 |
| WO | WO-2014/151656 A1 | 9/2014 |

\* cited by examiner

TURBINE POWER GENERATION SYSTEM

CROSS-REFERENCE TO RELATED APPLICATIONS

This application is based upon and claims the benefit of priority from Japanese Application (Japanese Patent Application No. 2020-119048), filed on Jul. 10, 2020; the entire contents of which are incorporated herein by reference.

FIELD

An embodiment of the present invention relates to a turbine power generation system.

BACKGROUND

In a turbine power generation system, a turbine rotor configuring a turbine is connected to a power generator rotor configuring a power generator. In the turbine power generation system, introduction of a working medium into a turbine casing causes the turbine rotor to rotate. Then, the rotation of the turbine rotor causes the power generator rotor to rotate, to thereby generate power in the power generator.

In the turbine power generation system, examples of the turbine include a steam turbine, a gas turbine, a $CO_2$ turbine into which a supercritical $CO_2$ working medium is to be introduced, and so on. The turbine tends to have a larger capacity in order to increase the power generation output, and at the same time, is required to improve the performance in order to reduce $CO_2$ emissions.

The turbine has been known to have a multiple casing configuration in order to increase the capacity of the turbine power generation system.

The turbine power generation system with a multiple casing configuration is explained while using FIG. 4 and FIG. 5.

As illustrated in FIG. 4, in a turbine power generation system 1a, a turbine 10 has a two-casing configuration, and includes a first turbine part 11a housing a first turbine rotor 112a in a first turbine casing 111a, and a second turbine part 11b housing a second turbine rotor 112b in a second turbine casing 111b. The first turbine part 11a is, for example, a single-flow high-pressure turbine part, the second turbine part 11b is, for example, a double-flow low-pressure turbine part, and the first turbine rotor 112a and the second turbine rotor 112b are connected.

As illustrated in FIG. 4, a power generator 20 includes a power generator rotor 202 housed in a power generator casing 201, and the power generator rotor 202 is connected to the second turbine rotor 112b via a coupling 30. The power generator 20 is caused to generate power by rotation of the power generator rotor 202 caused by rotations of the first turbine rotor 112a and the second turbine rotor 112b.

Further, as illustrated in FIG. 5, in a turbine power generation system 1b, a turbine 10 has a three-casing configuration, and further includes, in addition to the first turbine part 11a and the second turbine part 11b, a third turbine part 11c housing a third turbine rotor 112c in a third turbine casing 111c. The first turbine part 11a is, for example, a single-flow high-pressure turbine part, the second turbine part 11b and the third turbine part 11c are, for example, double-flow low-pressure turbine parts, and the first turbine rotor 112a, the second turbine rotor 112b, and the third turbine rotor 112c are connected.

As illustrated in FIG. 5, the power generator 20 includes the power generator rotor 202 connected to the third turbine rotor 112c via the coupling 30. The power generator 20 is caused to generate power by rotation of the power generator rotor 202 caused by rotations of the first turbine rotor 112a, the second turbine rotor 112b, and the third turbine rotor 112c.

As described above, the turbine power generation systems 1a, 1b with a multiple casing configuration can be increased in capacity to achieve higher output, but the overall length in the axial direction becomes longer. This increases an installation area, thus making it difficult to secure a place for installation. Further, due to a large number of parts, maintenance is not easy.

A turbine power generation system with a single casing configuration is explained while using FIG. 6.

As illustrated in FIG. 6, in a turbine power generation system 1c with a single casing configuration, a turbine 10 is a single-flow type, and houses a turbine rotor 112 in a turbine casing 111.

The power generator 20 includes the power generator rotor 202 connected to the turbine rotor 112 via the coupling 30. The power generator 20 is caused to generate power by rotation of the power generator rotor 202 caused by rotation of the turbine rotor 112.

The turbine power generation system 1c with a single casing configuration has an overall length in the axial direction shorter than the turbine power generation systems 1a, 1b with a multiple casing configuration, thus making it easier to secure a place for installation, and due to a small number of parts, maintenance is easy. However, in the turbine power generation system 1c with a single casing configuration, it is not easy to inhibit the turbine rotor 112 from reaching an overspeed condition in which the turbine rotor 112 rotates at an over-rotation speed exceeding its rated rotation speed, when load rejection is to be performed.

The load rejection is executed because of the occurrence of a problem in an electric power system (for example, the occurrence of an accident in a power transmission system because of thunderbolts). In the load rejection, the power generator 20 is rapidly disconnected from the power transmission system and a control valve, or the like installed upstream of the turbine is rapidly closed, to thereby stop the supply of a working medium to the turbine 10. When load rejection is to be performed, in the turbine 10, the energy remaining inside a pipe for supplying the working medium to the turbine casing 111 and the energy remaining inside the turbine casing 111 cause the turbine rotor 112 to rotate at an over-rotation speed exceeding its rated rotation speed. In the case of a high over-rotation speed, a large force is applied to rotary bodies such as the turbine rotor 112 and rotor blades supported by the turbine rotor 112, to increase the possibility of damage or the like.

The over-rotation speed (N maximum) is calculated by using the following equation (A), for example.

$$N \text{ maximum} = (7.3 \times 10^5 / GD2 \times (Er + \Delta E1 + \Delta E2 + \Delta E3)) \quad \text{Equation (A)}$$

In the equation (A), the respective factors are as follows.

Er: Rotational energy when rotating at a rated speed $\Delta E1$: Energy flowing into a turbine responsive to a valve delay time after load rejection $\Delta E2$: Energy flowing into a turbine responsive to a valve closing time after load rejection $\Delta E3$: Energy that is in a turbine and a pipe and is used to increase a speed after load rejection $GD2 = 4 \times J$ (J: turbine, a moment of inertia of a rotary part of a power generator)

As is clear from this, the over-rotation speed (N maximum) decreases as the moment of inertia of the rotary body increases, but the over-rotation speed increases as the moment of inertia of the rotary body decreases.

The turbine power generation system 1c with a single casing configuration (see FIG. 6) has a smaller number of turbine rotors 112 and has a shorter total length of the turbine rotor 112 as compared to the turbine power generation systems 1a, 1b with a multiple casing configuration (see FIG. 4, FIG. 5), and thus, the entire weight of the turbine rotor 112 is lower. Therefore, the turbine power generation system 1c with a single casing configuration has a difficulty in inhibiting the over-rotation speed (N maximum) because of having a smaller moment of inertia as compared to the turbine power generation systems 1a, 1b with a multiple casing configuration. When the turbine power generation system 1c with a single casing configuration is increased in capacity, in particular, inhibiting the over-rotation speed (N maximum) is not easy.

Due to these circumstances, it was difficult to increase the power generation capacity in the turbine power generation system 1c with a single casing configuration because it was necessary to reduce the flow rate of the working medium introduced into the turbine 10 and to reduce the heat drop between an inlet and an outlet. Specifically, the turbine power generation system 1c with a single casing configuration had a difficulty in achieving a power generation output of 150 MW or more, to thus need to have a multiple casing configuration.

A problem to be solved by the present invention is to provide a turbine power generation system with a single casing configuration capable of easily executing the inhibition of an over-rotation speed.

DETAILED DESCRIPTION

A turbine power generation system in an embodiment includes: a turbine including a turbine casing and a turbine rotor that rotates by a working medium to be introduced into the turbine casing; and a power generator including a power generator rotor connected to the turbine rotor, the power generator being caused to generate power by rotation of the power generator rotor caused by the rotation of the turbine rotor. The turbine includes the turbine casing that is single, and a moment of inertia of the power generator rotor is larger than a moment of inertia of the turbine rotor.

[A] Configuration

Figure 1:
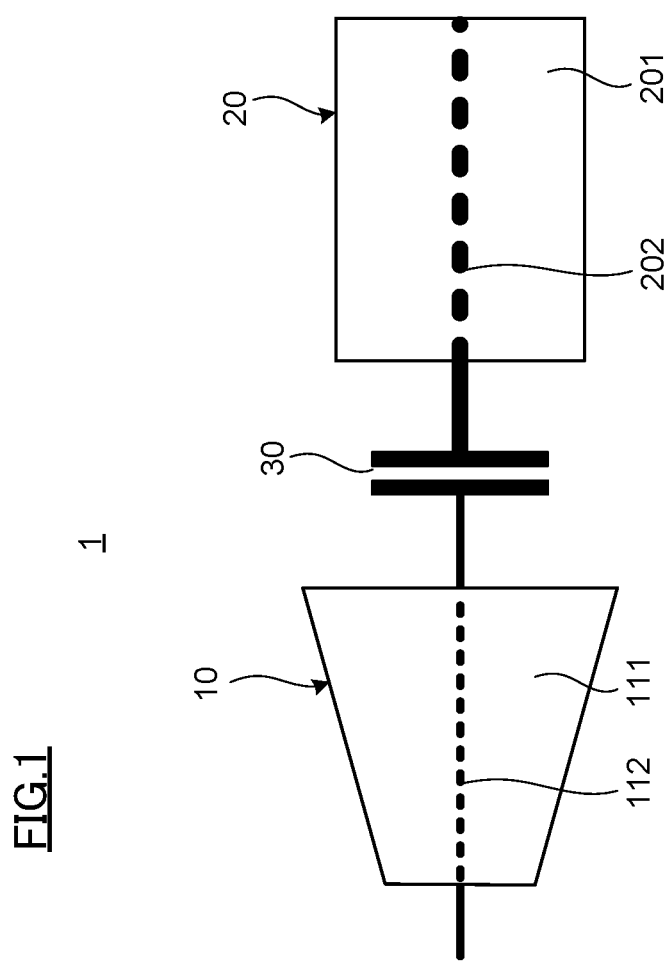
FIG. 1 is a view schematically illustrating an entire configuration of a turbine power generation system according to an embodiment.

The turbine power generation system according to the embodiment is explained while using FIG. 1.

Figure 6:
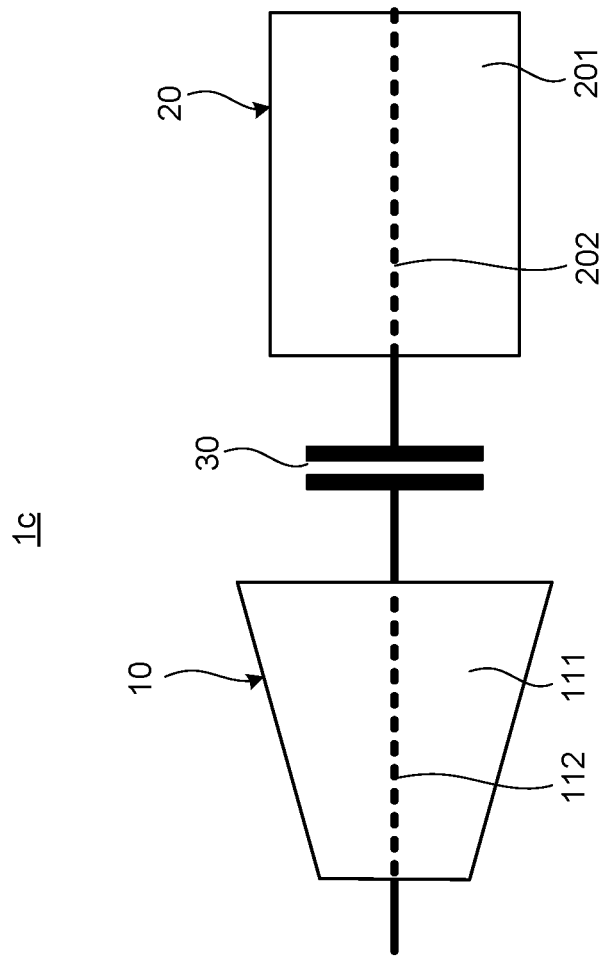
FIG. 6 is a view schematically illustrating a turbine power generation system with a single casing configuration according to the prior art.

As illustrated in FIG. 1, a turbine power generation system 1 in this embodiment has a single casing configuration similarly to the above-described turbine power generation system 1c (see FIG. 6).

In the turbine power generation system 1, a turbine 10 is a single-flow type, and houses a turbine rotor 112 in a turbine casing 111.

A power generator 20 includes a power generator rotor 202 connected to the turbine rotor 112 via a coupling 30 and is caused to generate power by rotation of the power generator rotor 202 caused by rotation of the turbine rotor 112.

The turbine power generation system 1 in this embodiment has the single turbine casing 111 and has a power generation capacity of 150 MW or more. Further, the turbine power generation system 1 is configured to make the moment of inertia of the power generator rotor 202 larger than that of the turbine rotor 112. For example, the outside diameter of the power generator rotor 202 is larger than that of the turbine rotor 112.

[B] Operation•Effect

As in this embodiment, in the turbine power generation system 1 having the single turbine casing 111 and a large power generation capacity, in order to inhibit the turbine rotor 112 from rotating at an over-rotation speed exceeding its rated rotation speed when load rejection is to be performed, increasing the moment of inertia of the turbine rotor 112 and the moment of inertia of the power generator rotor 202 is desired.

The following equation (i) represents the relationship between an annular area S of an annular turbine flow path through which the working medium passes inside the turbine 10, an average diameter PCD of the turbine flow path, and a height H of turbine blades (rotor blade·stator blade).

$$S = \pi \times PCD \times H \qquad \text{Equation (i)}$$

The average diameter PCD of the turbine flow path is represented by a diameter D of the turbine rotor 112 (path inside diameter) and the height H of the turbine blades (rotor blade·stator blade) as represented in the following equation (ii).

$$PCD = D + H \qquad \text{Equation (ii)}$$

In order to increase the moment of inertia of the turbine rotor 112, the diameter D of the turbine rotor 112 needs to be increased. However, as is clear from the equation (i) and the equation (ii), in the case of the same annular area S, as the diameter D of the turbine rotor 112 is increased, the height H of the turbine blades (rotor blade·stator blade) is reduced. The performance of the turbine 10 decreases as the height H of the turbine blades (rotor blade·stator blade) is reduced. Therefore, it is difficult to arbitrarily increase the diameter D of the turbine rotor 112 in order to maintain the performance of the turbine 10, and it is not easy to increase the moment of inertia of the turbine rotor 112.

Further, increasing the diameter D of the turbine rotor for the purpose of increasing the moment of inertia of the turbine rotor 112 is not easy in terms of strength design because the centrifugal force of the rotor blades increases.

However, in this embodiment, as described above, the moment of inertia of the power generator rotor 202 is larger than that of the turbine rotor 112. As a result, the turbine power generation system 1 having the single turbine casing 111 and a large power generation capacity in this embodiment is capable of maintaining the performance of the turbine 10, and at the same time, effectively inhibiting the turbine rotor 112 from rotating at an over-rotation speed when load rejection is to be performed.

Conventionally, the turbine power generation system 1c with a single casing configuration had a difficulty in achieving a power generation output of 150 MW or more, and was configured to have a multiple casing, to thereby achieve the power generation output of 15 MW or more. However, as described above, this embodiment can achieve both the performance of the turbine 10 and the inhibition of the turbine rotor 112 from overspeeding when load rejection is to be performed, and thus it is possible to achieve the power generation capacity of 150 MW or more in the turbine power generation system 1 with a single casing configuration.

[C] Modified Example

Figure 2:
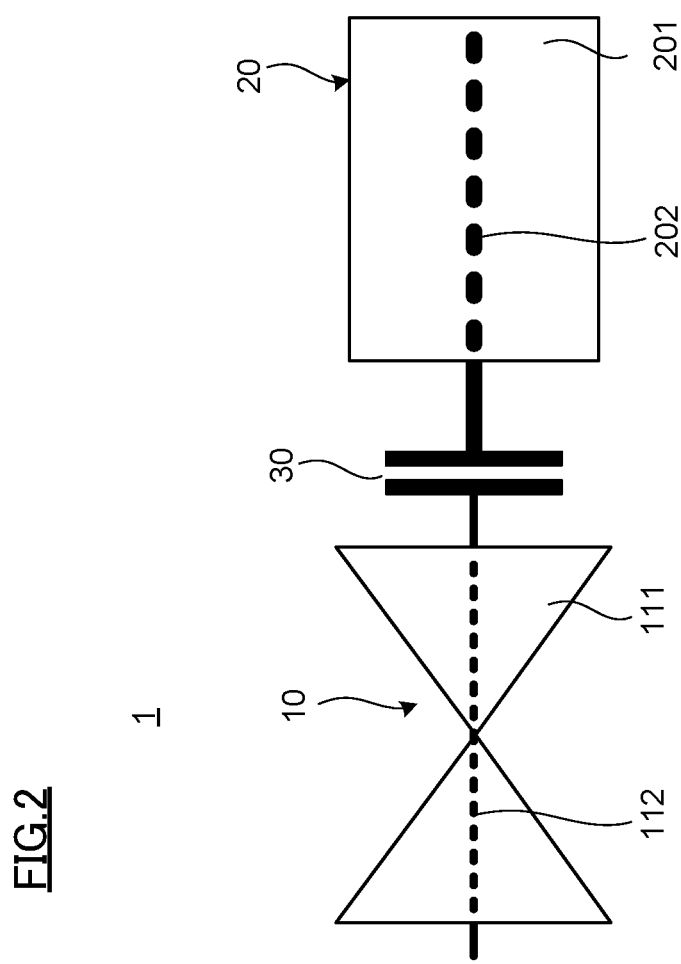
FIG. 2 is a view schematically illustrating an entire configuration of a turbine power generation system according to a modified example of the embodiment.
Figure 3:
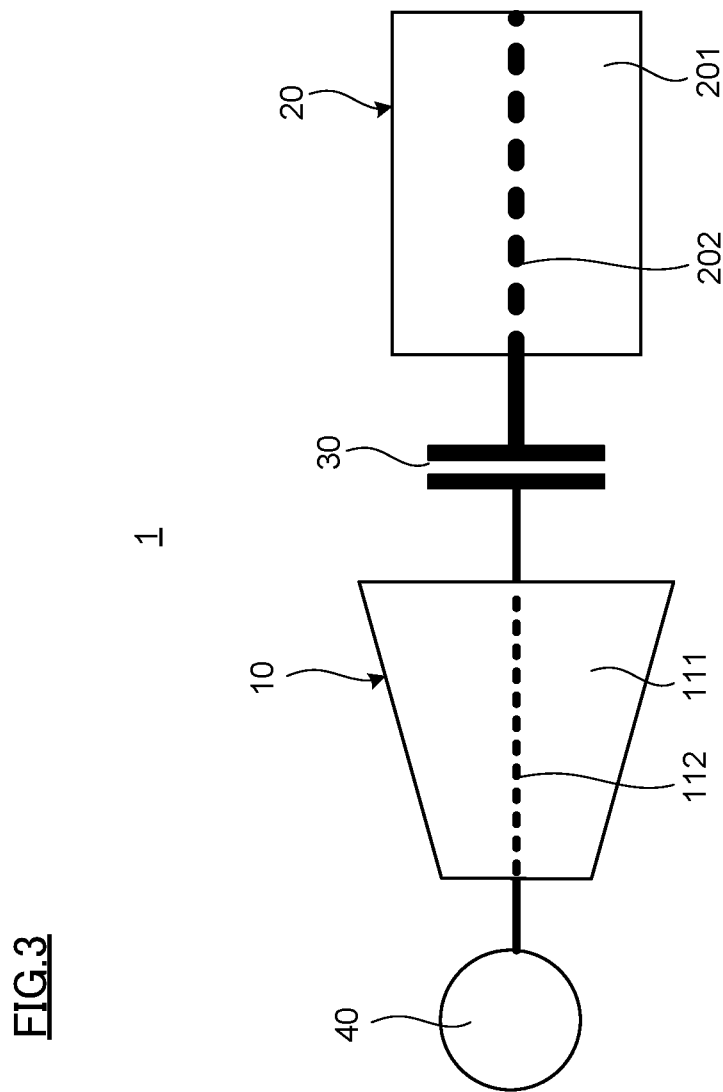
FIG. 3 is a view schematically illustrating an entire configuration of a turbine power generation system according to a modified example of the embodiment.
Figure 4:
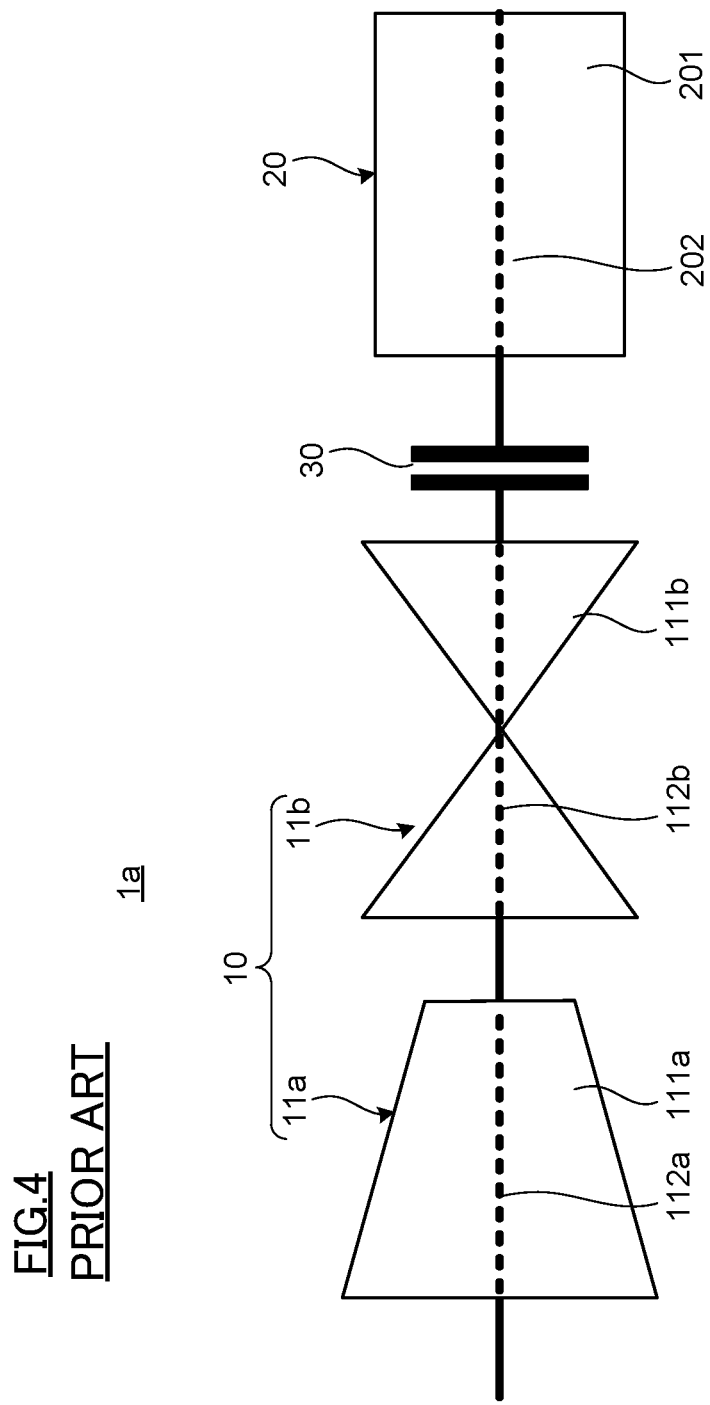
FIG. 4 is a view schematically illustrating a turbine power generation system with a multiple casing configuration according to a prior art.
Figure 5:
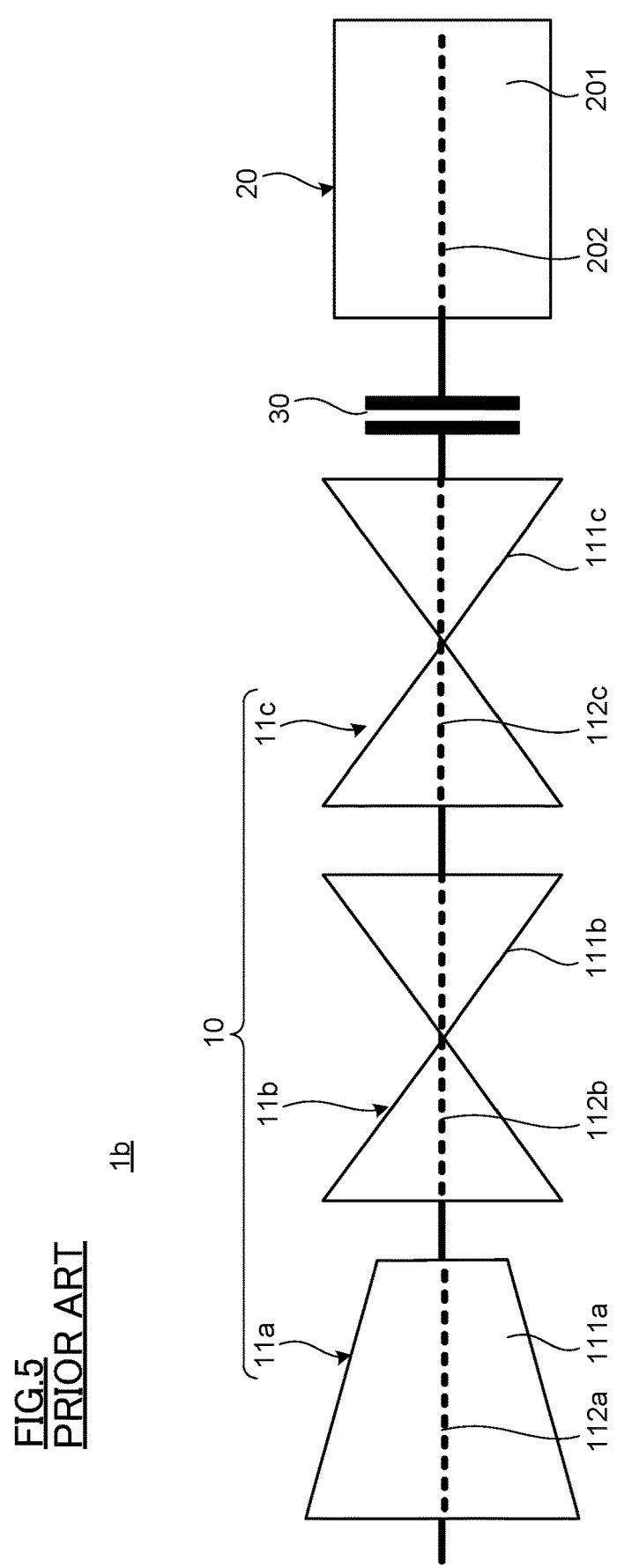
FIG. 5 is a view schematically illustrating a turbine power generation system with a multiple casing configuration according to the prior art.

There are explained turbine power generation systems according to modified examples in the embodiment while using FIG. 2 and FIG. 3.

As illustrated in FIG. 2, in the turbine power generation system 1 in this embodiment, the turbine 10 may be a double-flow type other than the single-flow type (see FIG. 1).

Further, as illustrated in FIG. 3, the turbine power generation system 1 in this embodiment may include a pressure booster part 40 such as a compressor or a pump. The pressure booster part 40 is installed, for example, on the other end side of the turbine rotor 112 located opposite to one end side located on the power generator rotor 202 side, and a rotary shaft (whose illustration is omitted) of the pressure booster part 40 is connected to the turbine rotor 112.

Even in the case of the configurations illustrated in FIG. 2 and FIG. 3, the same effect as that of the above-described embodiment can be exhibited by making the moment of inertia of the power generator rotor 202 larger than that of the turbine rotor 112.

Others

While certain embodiments of the present invention have been described above, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST

1: turbine power generation system, 1a: turbine power generation system, 1b: turbine power generation system, 1c: turbine power generation system, 10: turbine, 11a: first turbine part, 11b: second turbine part, 11c: third turbine part, 20: power generator, 30: coupling, 40: pressure booster part, 111: turbine casing, 111a: first turbine casing, 111b: second turbine casing, 111c: third turbine casing, 112: turbine rotor, 112a: first turbine rotor, 112b: second turbine rotor, 112c: third turbine rotor, 201: power generator casing, 202: power generator rotor.

What is claimed is:

1. A turbine power generation system, comprising:
   a turbine including a turbine casing and a turbine rotor for rotating by a working medium to be introduced into the turbine casing; and
   a power generator including a power generator rotor connected to the turbine rotor, the power generator being caused to generate power by rotation of the power generator rotor caused by the rotation of the turbine rotor, wherein
   the turbine casing of the turbine is a single casing, and
   a moment of inertia of the power generator rotor is larger than a moment of inertia of the turbine rotor.

2. The turbine power generation system according to claim 1, wherein a power generation capacity is 150 MW or more.

3. The turbine power generation system according to claim 1, wherein an outside diameter of the power generator rotor is larger than that of the turbine rotor.

* * * * *